US012627245B2

(12) United States Patent
Kojima Makimura et al.

(10) Patent No.: US 12,627,245 B2
(45) Date of Patent: May 12, 2026

(54) PHASE ANGLE DETECTION SYSTEM, CONTROL DEVICE, AND PHASE ANGLE DETECTION METHOD

(71) Applicant: TOSHIBA MITSUBISHI-ELECTRIC INDUSTRIAL SYSTEMS CORPORATION, Tokyo (JP)

(72) Inventors: Ayame Kojima Makimura, Tokyo (JP); Yusuke Ishimaru, Tokyo (JP); Shunsuke Tobayashi, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 18/703,778

(22) PCT Filed: Oct. 13, 2022

(86) PCT No.: PCT/JP2022/038281
§ 371 (c)(1),
(2) Date: Apr. 23, 2024

(87) PCT Pub. No.: WO2024/079861
PCT Pub. Date: Apr. 18, 2024

(65) Prior Publication Data
US 2025/0274063 A1 Aug. 28, 2025

(51) Int. Cl.
*H02P 8/34* (2006.01)
*H02P 6/16* (2016.01)
(52) U.S. Cl.
CPC ...................................... *H02P 6/16* (2013.01)

(58) Field of Classification Search
CPC ...... H02P 6/16; H02P 6/06; H02P 6/30; H02P 27/06
See application file for complete search history.

(56) References Cited

U.S. PATENT DOCUMENTS

2020/0088294 A1* 3/2020 Kamio .................... F16H 61/32

FOREIGN PATENT DOCUMENTS

JP 2018-29458 A 2/2018

* cited by examiner

*Primary Examiner* — Muhammad S Islam
(74) *Attorney, Agent, or Firm* — Oblon, McClelland, Maier & Neustadt, L.L.P.

(57) ABSTRACT

A phase angle detection system according to one aspect of the embodiment detects a phase angle of an electric motor in a drive system provided with a transmission unit that changes a rotation speed of the electric motor. The phase angle detection system includes a first sensor, a second sensor, and an arithmetic processing unit. The first sensor outputs a first signal for detecting at least a specific phase angle of a rotor of the electric motor. The second sensor outputs a second signal capable of detecting an amount of rotation of an output axis of the transmission unit. The arithmetic processing unit calculates, with an amount of deviation included in a result of the detection of a specific phase angle by the first signal defined for each rotational direction of the electric motor in advance, an estimated value of an absolute angle of the rotor of the electric motor using the amount of deviation of the first signal determined by a rotational direction of the electric motor, a result of the detection of the first signal, and the second signal.

12 Claims, 4 Drawing Sheets

PHASE ANGLE DETECTION SYSTEM, CONTROL DEVICE, AND PHASE ANGLE DETECTION METHOD

TECHNICAL FIELD

Embodiments of the present invention relate to a phase angle detection system, a control device, and a phase angle detection method.

BACKGROUND ART

There is a rotary encoder that outputs an A phase/B phase pulse for detecting the relative angle of an axis and a pulse (referred to as Z pulse) for detecting the absolute angle of the axis.

Incidentally, a transmission unit such as a gear or a friction wheel may be provided on an axis of a rotor of an electric motor, and a rotary encoder may be provided on an output axis of this transmission unit. In such a configuration, even if a rotary encoder is used to detect rotation of the output axis of the transmission unit, it has not been easy to detect a position of the rotor of the electric motor on the basis of the Z pulse output by this rotary encoder.

CITATION LIST

Patent Document

Patent Document 1

Japanese Unexamined Patent Application, First Publication No. 2018-29458

SUMMARY OF INVENTION

Technical Problem

An object of the present invention is to provide a phase angle detection system, a control device, and a phase angle detection method that enable detection of a position of a rotor of an electric motor in a configuration in which a rotary encoder is provided on an output axis of a transmission unit that changes a rotation speed of an electric motor.

Solution to Problem

A phase angle detection system according to the embodiment detects a phase angle of an electric motor in a drive system provided with a transmission unit that changes a rotation speed of the electric motor. The phase angle detection system includes a first sensor, a second sensor, and an arithmetic processing unit. The first sensor outputs a first signal for detecting at least a specific phase angle of a rotor of the electric motor. The second sensor outputs a second signal capable of detecting an amount of rotation of an output axis of the transmission unit. The arithmetic processing unit calculates, with an amount of deviation included in a result of the detection of a specific phase angle by the first signal defined for each rotational direction of the electric motor in advance, an estimated value of an absolute angle of the rotor of the electric motor using the amount of deviation of the first signal determined by a rotational direction of the electric motor, a result of the detection of the first signal, and the second signal.

DESCRIPTION OF EMBODIMENTS

Figure 1:
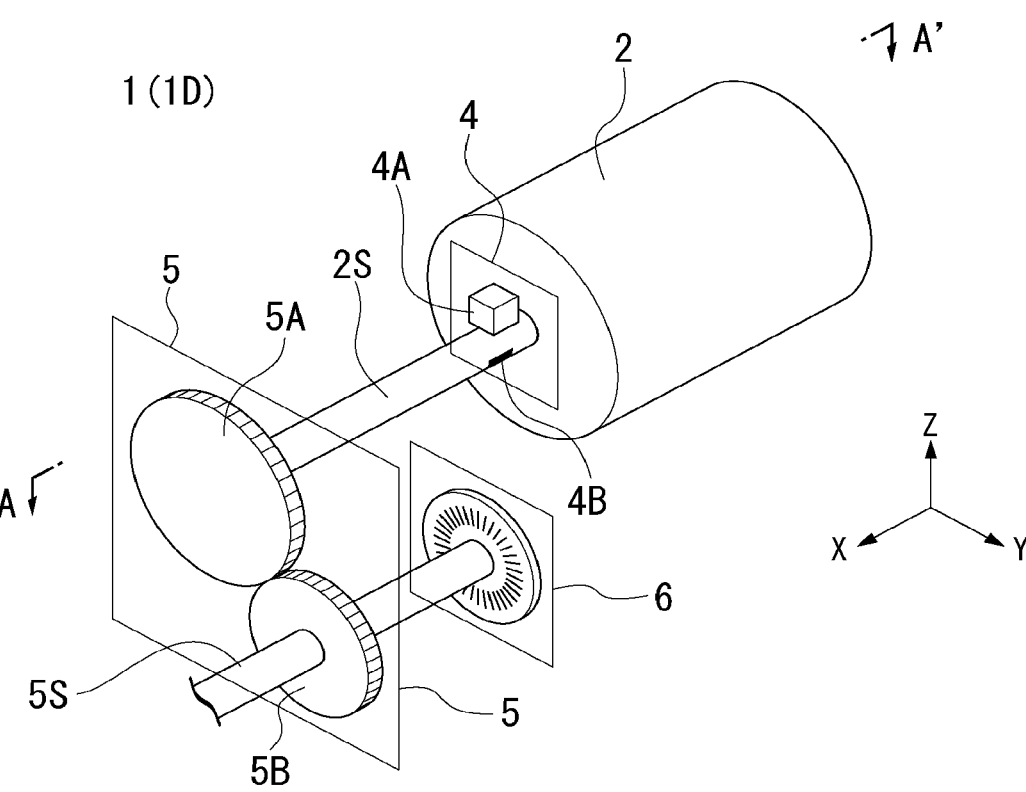
FIG. 1 is an overhead view of a drive system to which a phase angle detection system of an embodiment is applied.

Hereinafter, a phase angle detection system, a control device, and a phase angle detection method according to embodiments will be described with reference to the drawings. In addition, in the following description, components having the same or similar functions are given the same reference numerals. Then, redundant descriptions of those configurations may be omitted. Note that being electrically connected is sometimes simply referred to as "being connected."

Note that a "speed of an axis" refers to a rotational angular speed or an angular speed of the axis. A "position of the axis" refers to a rotation angle (mechanical angle) or a phase of the axis.

Figure 2:
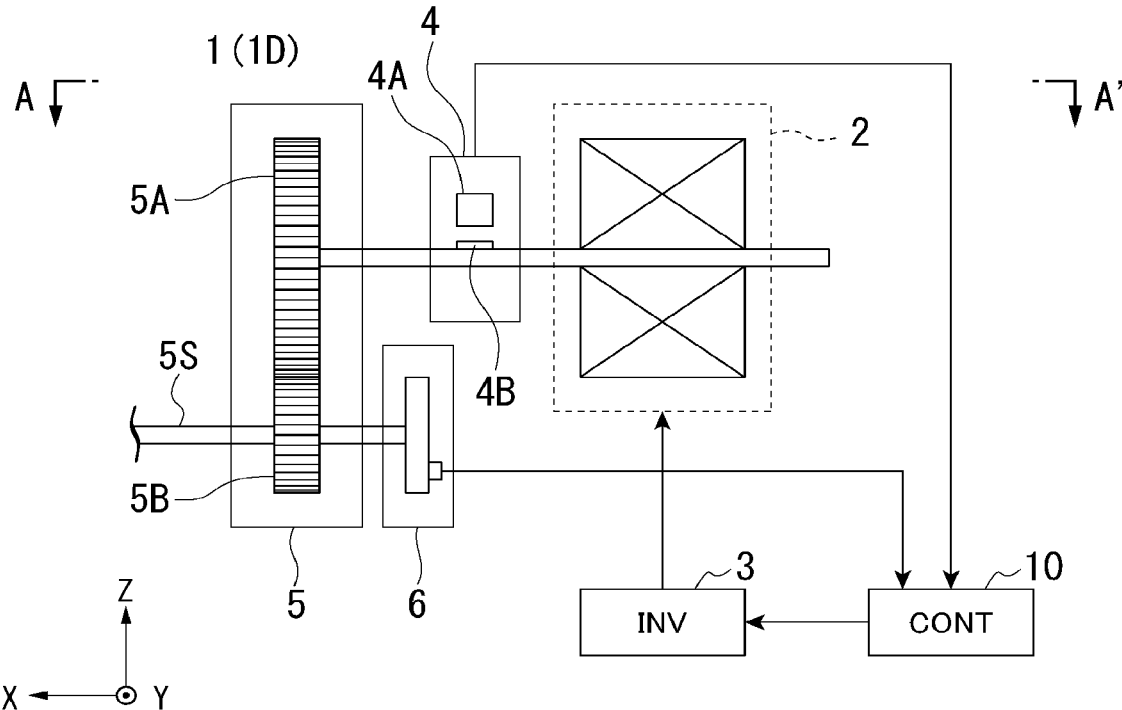
FIG. 2 is a configuration diagram of the phase angle detection system of the embodiment.

FIG. 1 is an overhead view of a drive system 1D to which the phase angle detection system 1 of the embodiment is applied. FIG. 2 is a configuration diagram of the phase angle detection system 1 of the embodiment.

The drive system 1D includes, for example, a synchronous motor 2 (M), an inverter 3 (INV), a position sensor 4 (first sensor, PS), a transmission 5 (transmission unit, G), and an encoder 6 (second sensor, PS), and a control device 10. The drive system 1D does not include the phase angle detection system 1.

The phase angle detection system 1 includes, for example, a position sensor 4 disposed on an axis 2S of the synchronous motor 2, an encoder 6 disposed on an output axis of the transmission 5, and at least one of functional units constituting the control device 10. For example, the control device 10 includes a position speed calculation unit 11 (arithmetic processing unit, VEL or POS CALC), a subtractor 12, and a controller 13 (CONT). The position speed calculation unit 11 is an example of the phase angle detection system 1 described above.

The synchronous motor 2 includes a main body, a stator (not shown), a stator winding (not shown), a rotor (not shown), the axis 2S connected to the rotor, and the like. The synchronous motor 2 is, for example, an excitation type synchronous motor or a permanent magnet type synchronous motor. A stator, a stator winding, a rotor, and a field winding (not shown) are provided in the main body of the synchronous motor 2. Control of the synchronous motor 2 has required magnetic pole phase angle detection of the synchronous motor 2 in some cases. In particular, in a case of the synchronous motor 2 immediately after starting, since a magnetic pole position is unknown, it is necessary to detect an initial magnetic pole position thereof.

The transmission 5 includes an input axis (not shown), an output axis 5S, and a converter main body (5A or 5B). The converter main body converts a speed of the input axis and a speed of the output axis 5S using a predetermined speed ratio. The converter main body includes, for example, a gear 5A that rotates together with the input axis and a gear 5B that rotates together with the output axis 5S.

For example, an input axis of the transmission 5 is connected to the axis 2S of the synchronous motor 2. A load (not shown) is connected to the output axis 5S of the transmission 5. The transmission 5 configured in this manner converts a speed of the axis 2S of the synchronous motor 2 and the speed of the output axis 5S.

Note that a configuration of the transmission 5 is not limited to a gear, and may be, for example, a friction wheel.

The position sensor 4 is provided on the axis 2S so as to be able to detect a rotation of the axis 2S of the synchronous motor 2, and detects a phase (mechanical angle) of the axis 2S.

The position sensor 4 is formed, for example, as a proximity sensor 4A that includes a magnetic unit 4B that generates an unevenness of a magnetic force around an axis of the synchronous motor 2, and a magnetic sensor that detects a magnetic force larger than a predetermined value.

For example, the magnetic unit 4B includes one or more magnets that generate unevenness of the magnetic force around the axis of the synchronous motor 2. This magnetic unit 4B is disposed on the axis of the synchronous motor 2.

Such a magnetic unit 4B generates a magnetic force of an unequal magnitude in a circumferential direction of the axis 2S. A distribution of the magnetic force includes one or more maximum points around the axis 2S. There is no limit to the number of maximum points, and the number may be determined as appropriate.

As the magnetic unit 4B rotates together with the axis 2S, a distance between the magnet and the proximity sensor 4A changes. The proximity sensor 4A is configured to detect an approach of the magnetic unit 4B, and detects that the magnetic unit 4B (magnet) disposed on the axis 2S has approached due to the rotation of the axis 2S.

If the axis 2S rotates, a position indicating the maximum point of magnetic force changes due to the accompanying rotation of the magnetic unit 4B. The proximity sensor 4A detects a magnetic force of a predetermined magnitude and outputs a signal (referred to as a Z pulse) indicating a result thereof.

The encoder 6 is a so-called rotary encoder that is provided on the output axis 5S of the transmission 5 and detects a position of the output axis 5S. For example, the encoder 6 includes a rotating body connected to be concentric with the output axis 5S. The rotating body is provided with a row of A-phase slits and a row of B-phase slits having minute widths on a circumference concentric with the output axis 5S. The encoder 6 optically reads a position of each slit and outputs a signal (A phase and B phase pulses) indicating a result of the reading.

A phase difference between the A-phase slit and the B-phase slit is approximately half a pitch of a slit in the circumferential direction. This phase difference makes it possible to detect the rotational direction.

The encoder 6 outputs a pulse corresponding to a slit passing through a predetermined position as the output axis 5S rotates. By detecting the number of the pulses, it is possible to detect a rotation angle of the output axis 5S. A general commercially available encoder can be applied to this encoder 6.

Figure 3:
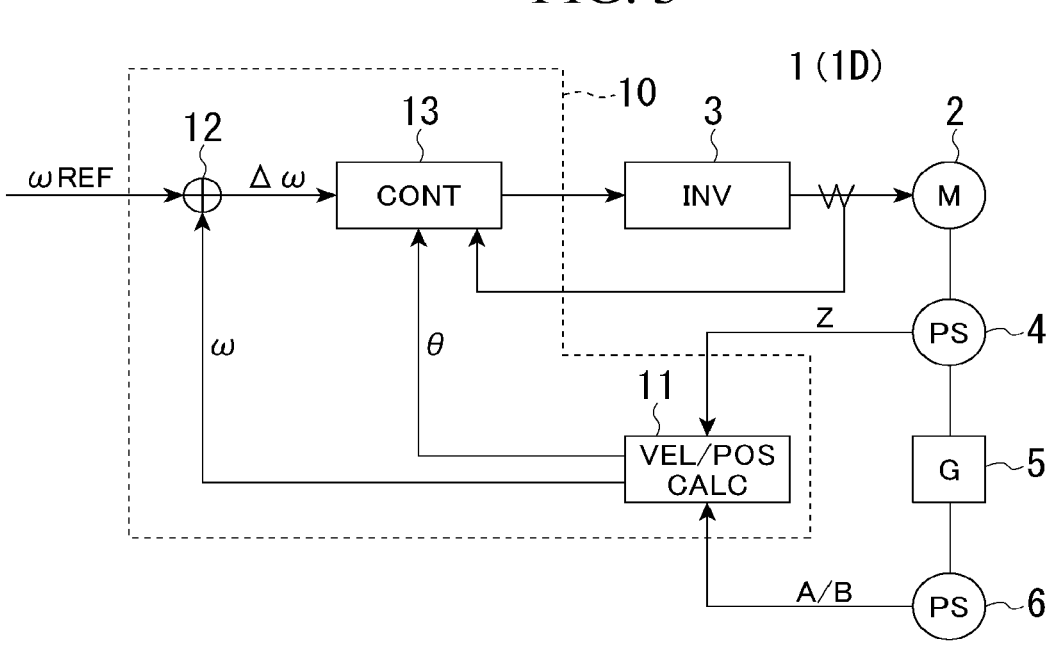
FIG. 3 is a configuration diagram of a control device of the embodiment.

FIG. 3 is a configuration diagram of the control device 10 of the embodiment.

The control device 10 includes a position speed calculation unit 11, a subtractor 12, and a controller 13.

The position speed calculation unit 11 receives the Z pulse from the position sensor 4 and the A phase and B phase pulses from the encoder 6, and indicates an angle of the axis 2S of the synchronous motor 2 on the basis of these pulses. The position speed calculation unit 11 uses a result of the detection of the Z pulse (a first signal) from the position sensor 4 and a signal (a second signal) capable of detecting the amount of rotation of the output axis of the transmission 5 to calculate an estimated value (a position θ) of an absolute angle of a rotor of the synchronous motor 2. The position speed calculation unit 11 outputs the generated position θ and an angular speed ω indicating an angular speed. Generation of the position θ and the angular speed ω will be described below.

The subtractor 12 calculates a deviation Δω between a speed command ωREF and the angular speed ω.

The controller 13 generates a gate pulse for controlling the inverter 3 so that the deviation Δω becomes 0. This gate pulse is used to control turning on or off of a switching element in the inverter 3.

Figure 4:
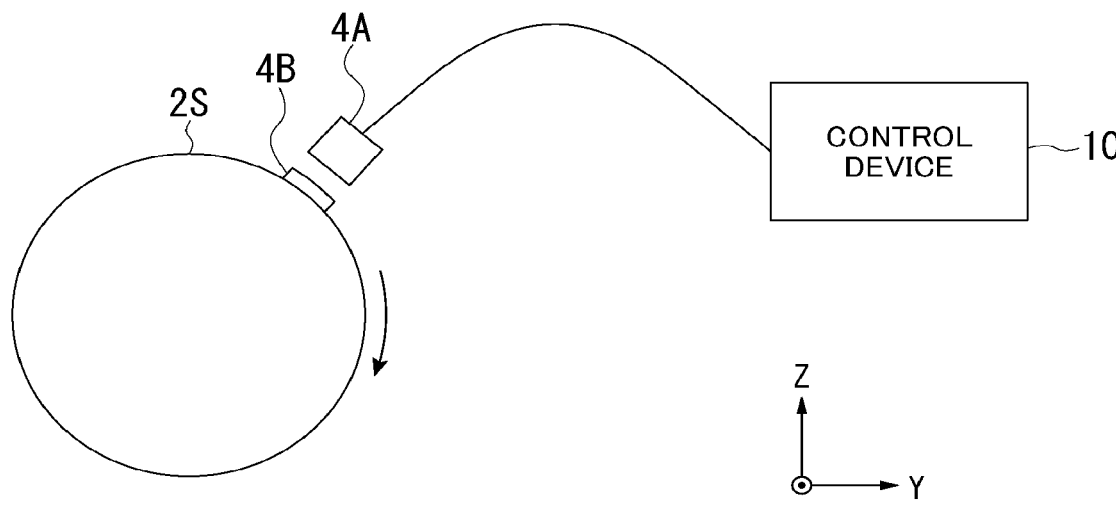
FIG. 4 is a diagram for describing generation of a Z pulse of the embodiment.

Referring to FIG. 4, a configuration example in which the Z pulse is generated using a proximity switch will be described.

Figure 5:
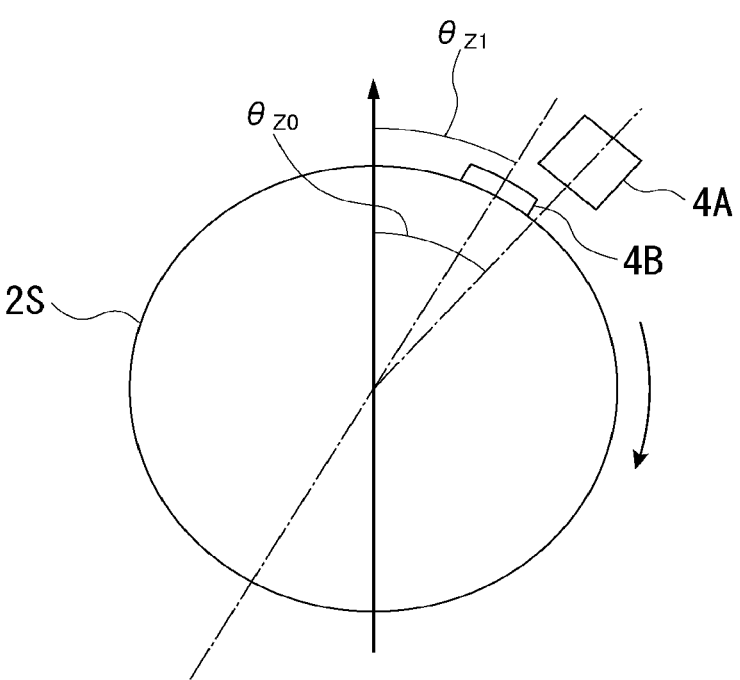
FIG. 5 is a diagram for describing the generation of the Z pulse of the embodiment.
Figure 6:
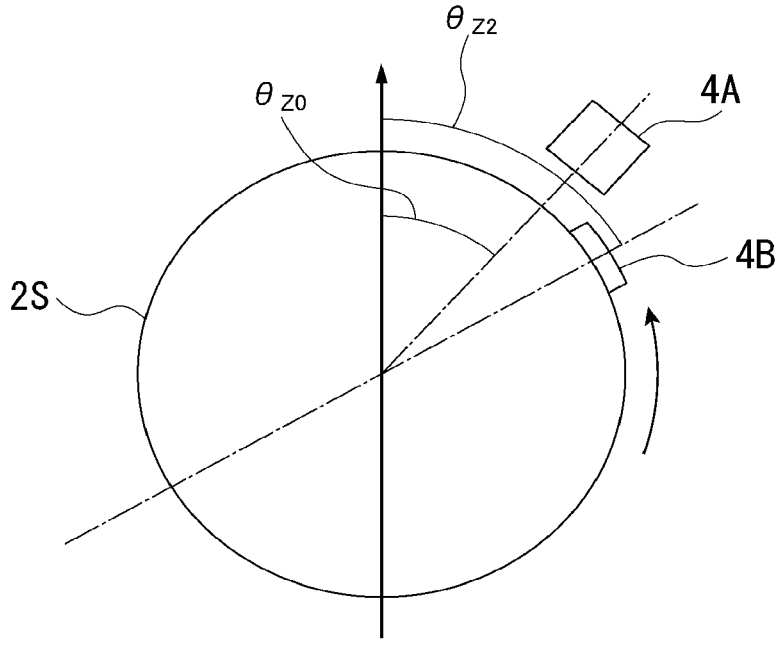
FIG. 6 is a diagram for describing the generation of the Z pulse of the embodiment.

FIGS. 4 to 6 are diagrams for describing the generation of the Z pulse in the embodiment.

A schematic configuration diagram shown in FIG. 4 shows a schematic configuration around the axis 2S of the synchronous motor 2, viewed from an extending direction of the axis 2S of the synchronous motor 2. The axis 2S shown in FIG. 4 is rotating clockwise and shows a state in which the magnetic unit 4B has approached a position closest to the proximity sensor 4A (a phase $\theta_{Z0}$).

A schematic configuration diagram shown in FIG. 5 shows a position at which the proximity sensor 4A responds to a magnetic field of the magnetic unit 4B when the axis 2S of the synchronous motor 2 is rotating clockwise. An upward arrow in FIG. 5 indicates a direction of the magnetic pole position. The proximity sensor 4A is disposed at a position rotated clockwise by a phase $\theta_{Z0}$ from the direction of the magnetic pole position. This phase $\theta_{Z0}$ indicates a position clockwise away from the direction of the magnetic pole position, and indicates that the proximity sensor 4A is disposed in this direction.

As shown in FIG. 5, before the magnetic unit 4B reaches the position closest to the proximity sensor 4A, the proximity sensor 4A detects the approach of the magnetic unit 4B. At this stage, the proximity sensor 4A starts outputting the Z pulse. In this manner, a position at which the proximity sensor 4A outputs the Z pulse when the axis is rotating clockwise is at a phase $\theta_{Z1}$.

A schematic configuration diagram shown in FIG. 6 shows the position at which the proximity sensor 4A responds to the magnetic field of the magnetic unit 4B when the axis 2S of the synchronous motor 2 is rotating counterclockwise.

As shown in FIG. 6, before the magnetic unit 4B reaches the position closest to the proximity sensor 4A, the proximity sensor 4A detects the approach of the magnetic unit 4B. At this stage, the proximity sensor 4A starts outputting the Z pulse. In this manner, a position at which the proximity sensor 4A outputs the Z pulse when the axis is rotating counterclockwise is at a phase $\theta_{Z2}$.

In this manner, the position at which the proximity sensor 4A responds to the magnetic field of the magnetic unit 4B differs depending on a difference in rotational direction between clockwise (normal rotation) and counterclockwise (reverse rotation). In other words, the positions at which the proximity sensor 4A starts outputting the Z pulse are different from each other. If the phase $\theta_{Z1}$ and the phase $\theta_{Z2}$ are

5 regarded as offset angles from the direction of the magnetic pole position, the offset angle cannot be defined by one value as the phase θZ0, but is defined by two values, the phase $\theta_{Z1}$ and the phase $\theta_{Z2}$. This offset angle can be associated with a rotational direction of the axis 2S.

In other words, at a time at which the proximity sensor 4A starts outputting the Z pulse, a measurement error that becomes apparent as an amount of deviation is included in a result of the detection of the position of the axis 2S with respect to a desired magnetic pole position (a specific phase angle). In other words, by appropriately compensating for this amount of deviation, it is possible to reproduce the magnetic pole position on the basis of the position at which the output of the Z pulse is started.

Therefore, the amount of deviation included in a result of the detection of a specific phase angle may be defined to compensate for a detection error of the position sensor 4, which varies depending on a rotational direction of the synchronous motor 2.

Figure 7:
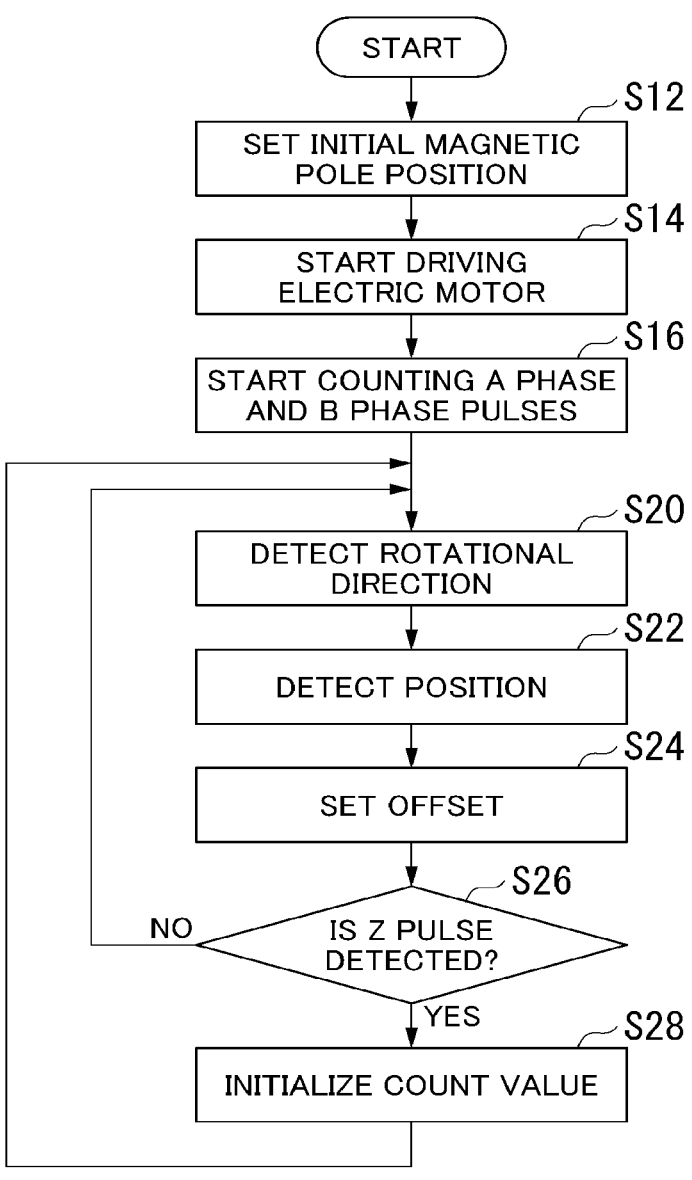
FIG. 7 is a flowchart of position detection processing of the embodiment.

FIG. 7 is a flowchart of position detection processing in the embodiment.

An initial state will be set. For example, the initial magnetic pole position will be set using the rotor of the synchronous motor 2 as a reference position.

A first offset phase $\theta_{Z1}$ and a second offset phase $\theta_{Z2}$ will be set. The first offset phase $\theta_{Z1}$ and the second offset phase $\theta_{Z2}$ may be fixed values.

The control device 10 starts supplying a desired gate pulse to the inverter 3 and starts driving the synchronous motor 2 (S14). The gate pulse at this stage may cause the synchronous motor 2 to rotate at a relatively low speed until the initial magnetic pole position is detected.

The position speed calculation unit 11 starts detecting and counting A phase and B phase pulses (S16).

The position speed calculation unit 11 detects the rotational direction of the synchronous motor 2 on the basis of a result of the detection of the A phase and B phase pulses (S20).

The position speed calculation unit 11 detects a position of the rotor of the synchronous motor 2 using a count value, which is a result of counting the A phase and B phase pulses (S22). For example, the position speed calculation unit 11 counts each pulse of A phase or B phase each time it is detected. By multiplying the count value that is a result of the counting by a unit angle corresponding to one pulse, an angle of rotation after a timing when counting is started can be obtained.

The position speed calculation unit 11 selects one of first phase correction information and second phase correction information using a result of the detection of the rotational direction. Using the correction information resulting from the selection, a result of the detection of the position of the rotor of the synchronous motor 2 (the count value described above) is corrected (S24). A result of this correction is output as a current position of the rotor of the synchronous motor 2.

The position speed calculation unit 11 identifies whether the Z pulse is detected (S26).

When the Z pulse is not detected, the position speed calculation unit 11 repeats the processing from step S20. On the other hand, when the Z pulse is detected, the position speed calculation unit 11 initializes the count value described above (S28). After this, the processing from step S20 is repeated.

As described above, changes in the amount of rotation can be captured by repeating the processing from step S20. Note that the control device 10 may interrupt the repeated processing described above when it receives a stop command from a higher-level device or the like. The control device 10 may retain the result of the counting during the interruption.

According to the embodiment described above, the phase angle detection system 1 is a phase angle detection system of the synchronous motor 2 in a drive system provided with a transmission unit that changes a rotation speed of the synchronous motor 2. The position sensor 4 (a first sensor) outputs a signal (a first signal, simply referred to as a Z pulse) including at least a Z pulse for detecting a specific phase angle of the rotor of the synchronous motor 2. The encoder 6 (a second sensor) outputs the A phase and B phase pulses (a second signal) of a rotary encoder that can detect the amount of rotation of the output axis 5S of the transmission 5. The position speed calculation unit 11 calculates, with an amount of deviation included in a result of the detection of a specific phase angle by the Z pulse described above defined for each rotational direction of the synchronous motor 2 in advance, an estimated value of the absolute angle of the rotor of the synchronous motor 2 using the amount of deviation of the Z pulse determined by a rotational direction of the synchronous motor 2, a result of the detection of the Z pulse, and the A phase and B phase pulses. As a result, the phase angle detection system 1 can detect a position of an axis of the rotor of the electric motor.

For example, a relationship between the position of the "rotor of the synchronous motor 2" and a direction of the magnetic pole position may be defined as a "specific phase angle." In this case, the "specific phase angle of the rotor of the synchronous motor 2" may be defined as an angle formed by the position (phase) of the "rotor of the synchronous motor 2" and the direction (phase) of the magnetic pole position. If a positional relationship between the position (phase) of the "rotor of the synchronous motor 2" and the direction (phase) of the magnetic pole position can be detected more accurately, the synchronous motor 2 can be controlled more accurately and more efficiently.

In addition, in a case of a comparative example, an accuracy of the positional relationship between the position (phase) of the "rotor of the synchronous motor 2" and the direction (phase) of the magnetic pole position may be insufficient, and the synchronous motor 2 may fail to start.

On the other hand, the accuracy of the positional relationship described above can be improved by applying the present embodiment, and thus it is possible to suppress failures in starting the synchronous motor 2.

Note that the position speed calculation unit 11 may detect a rotational direction of the output axis 5S of the transmission 5 on the basis of the A phase and B phase pulses of the encoder 6, and determine an amount of deviation corresponding to the detected rotational direction.

The position speed calculation unit 11 may count the number of pulses (pulse signals) included in the A phase and B phase pulses, detect the amount of rotation after the Z pulse described above is detected, and convert the counted amount of rotation to an initial value depending on the detection of the Z pulse.

As mentioned above, the A phase and B phase pulses are generated by the encoder 6. The Z pulse described above is generated by the position sensor 4. The encoder 6 and the position sensor 4 are different sensors, and axes on which they are disposed are also different. In this manner, in the present embodiment, by combining signals from different sensors, control that has not been achieved by using only the encoder 6 is made possible.

The position speed calculation unit 11 detects the rotational direction of the output axis 5S of the transmission 5 on the basis of the A phase and B phase pulses. For example, when the rotation in the first rotational direction of the output axis 5S of the transmission 5 is detected, the position speed calculation unit 11 uses a first amount of deviation among the amounts of deviation corresponding to the first rotational direction to calculate the estimated value of the absolute angle of the rotor of the synchronous motor 2. On the other hand, when the rotation in the second rotational direction of the output axis 5S of the transmission 5 is detected, the position speed calculation unit 11 uses a second amount of deviation among the amounts of deviation corresponding to the second rotational direction to calculate the estimated value of the absolute angle of the rotor of the synchronous motor 2. As a result, even when the present embodiment is applied to applications that allow inversion, an accuracy of the estimated value of the absolute angle of the rotor of the synchronous motor 2 can be improved.

The position speed calculation unit 11 may detect at least an amount of offset from a specific phase angle of the rotor of the synchronous motor 2 on the basis of the A phase and B phase pulses.

Note that the control device 10 of the embodiment described above is, for example, a control device of a drive system 1D provided with a transmission 5 that changes the rotation speed of the synchronous motor 2. The control device 10 includes a position speed calculation unit 11 (an arithmetic processing unit) and a controller 13. The position speed calculation unit 11 acquires a signal including a Z pulse for detecting at least a specific phase angle of the rotor of the synchronous motor 2 from the position sensor 4, and acquires A phase and B phase pulses (a second signal) capable of detecting the amount of rotation of the output axis 5S of the transmission 5 from the encoder 6. The position speed calculation unit 11 calculates, with an amount of deviation included in a result of the detection of a specific phase angle by the Z pulse defined for each rotational direction of the synchronous motor 2 in advance, an estimated value of an absolute angle of the rotor of the synchronous motor 2 using the amount of deviation of the Z pulse determined by a rotational direction of the synchronous motor 2, a result of the detection of the Z pulse, and the A phase and B phase pulses. The controller 13 controls the synchronous motor 2 using the estimated value of the absolute angle of the rotor of the synchronous motor 2. As a result, the control device 10 described above can detect the position of the axis of the rotor of the synchronous motor 2 and control the synchronous motor 2.

For example, a phase difference may occur between a phase of the Z pulse generated by the proximity switch type position sensor 4 and a phase of the magnetic pole position. A magnitude of this phase difference differs depending on the rotational direction (a normal rotation side and a reverse rotation side) of the axis 2S. For this reason, if there is only one variable (an offset amount adjustment parameter) that compensates for this phase difference, when the rotation is adjusted in one direction of a normal rotation or a reverse rotation, an accuracy in the other direction will decrease. Instead, if the phase difference is adjusted to an intermediate (average) value between a phase difference during the normal rotation and a phase difference during the reverse rotation, the accuracy will decrease in both directions.

In the embodiment described above, by providing one variable for compensating the phase difference (offset amount adjustment parameter) for each in association with the rotational direction, it is possible to handle both directions of the normal rotation and the reverse rotation.

When it is not possible to install the rotary encoder type encoder 6 on the axis 2S of the synchronous motor 2, the Z pulse can be detected by the position sensor 4 disposed on the axis 2S of the synchronous motor 2, and it is now possible to handle a switch between the normal rotation and the reverse rotation by using this.

Note that the control device 10 of the embodiment described above may be realized at least in part by a software functional unit that functions when a processor such as a CPU executes a program, or may be entirely realized by a hardware functional unit such as an LSI.

According to at least one embodiment described above, the phase angle detection system detects a phase angle of an electric motor in a drive system provided with a transmission unit that changes a rotation speed of the electric motor. The phase angle detection system includes a first sensor, a second sensor, and an arithmetic processing unit. The first sensor outputs a first signal for detecting at least a specific phase angle of the rotor of the electric motor. The second sensor outputs a second signal capable of detecting an amount of rotation of the output axis of the transmission unit. The arithmetic processing unit calculates, with an amount of deviation included in a result of the detection of a specific phase angle by the first signal defined for each rotational direction of the electric motor in advance, an estimated value of the absolute angle of the rotor of the electric motor using the amount of deviation of the first signal determined by the rotational direction of the electric motor, a result of the detection of the first signal, and the second signal. As a result, a position of the axis of the rotor of the electric motor can be detected in a drive system in which a rotary encoder is provided on the output axis of the transmission unit that changes the rotation speed of the electric motor.

Although several embodiments of the present invention have been described, these embodiments are presented as examples and are not intended to limit the scope of the invention. These embodiments can be implemented in various other forms, and various omissions, substitutions, and changes can be made within a range not departing from the gist of the invention. These embodiments and their modifications are included within the scope and gist of the invention as well as within the scope of the invention described in the claims and its equivalents.

For example, as an example of the detection method of the position sensor 4, an example of detecting a change in the magnitude of the magnetic field has been exemplified, but the present invention is not limited to this. As an alternative detection method, changes in the magnitude of the electric field may be detected.

The magnetic unit 4B of the position sensor 4 is sometimes called a striker. In the embodiment described above, a case is shown in which one striker is provided around the axis 2S, but the present invention is not limited to this. Alternatively, a plurality of strikers may be arranged around the axis 2S. The number of strikers may be determined in association with the number of poles of the synchronous motor 2, or may be determined on the basis of a size of the axis 2S. When the plurality of strikers are arranged around the axis 2S, the pitches may also be aligned.

REFERENCE SIGNS LIST

1 Phase angle detection system
1D Drive system
2 Synchronous motor (electric motor)
3 Inverter

4 Position sensor
5 Transmission
6 Encoder
10 Control device
11 Position speed calculation unit
12 Subtractor
13 Controller

The invention claimed is:

1. A phase angle detection system of an electric motor in a drive system, which is provided with a transmission unit that changes a rotation speed of an electric motor, comprising:

a first sensor configured to output a first signal for detecting at least a specific phase angle of a rotor of the electric motor;

a second sensor configured to output a second signal capable of detecting an amount of rotation of an output axis of the transmission unit; and an arithmetic processing unit configured to calculate, with an amount of deviation included in a result of the detection of a specific phase angle by the first signal defined for each rotational direction of the electric motor in advance, an estimated value of an absolute angle of the rotor of the electric motor using the amount of deviation of the first signal determined by a rotational direction of the electric motor, a result of the detection of the first signal, and the second signal.

2. The phase angle detection system according to claim 1, wherein the arithmetic processing unit detects a rotational direction of the output axis on the basis of the second signal and determines the amount of deviation corresponding to the detected rotational direction.

3. The phase angle detection system according to claim 2, wherein the arithmetic processing unit counts a pulse signal included in the second signal to detect an amount of rotation after detection of the first signal, and sets the counted amount of rotation to an initial value in response to the detection of the first signal.

4. The phase angle detection system according to claim 1, wherein the arithmetic processing unit detects a rotational direction of the output axis on the basis of the second signal, calculates the estimated value of the absolute angle of the rotor using a first amount of deviation among amounts of deviation corresponding to a first rotational direction when a rotation of the first rotational direction of the output axis is detected, and calculates an estimated value of an absolute angle of the rotor using a second amount of deviation among amounts of deviation corresponding to a second rotational direction when a rotation of the second rotational direction of the output axis is detected.

5. The phase angle detection system according to claim 1, wherein the first sensor includes a magnetic unit that generates an unevenness of a magnetic force around an axis of the electric motor, and a magnetic sensor that detects the magnetic force larger than a predetermined value.

6. The phase angle detection system according to claim 5, wherein the magnetic unit includes a magnet that generates an unevenness of a magnetic force around an axis of the electric motor, and is disposed on the axis of the electric motor.

7. The phase angle detection system according to claim 6, wherein the first sensor includes a magnetic sensor that is capable of detecting an approach of the magnet disposed on the axis.

8. The phase angle detection system according to claim 1, wherein an amount of deviation included in a result of detection of the specific phase angle is defined to compensate for a detection error of the first sensor.

9. The phase angle detection system according to claim 8, wherein an amount of deviation included in the result of the detection of the specific phase angle is defined to compensate for a detection error of the first sensor that varies depending on a rotational direction of the electric motor.

10. The phase angle detection system according to claim 1, wherein the arithmetic processing unit detects at least an amount of offset from a specific phase angle of the rotor of the electric motor on the basis of the second signal.

11. A control device of a drive system provided with a transmission unit that changes a rotation speed of an electric motor, comprising:

an arithmetic processing unit configured to acquire a first signal for detecting at least a specific phase angle of a rotor of the electric motor from a first sensor, to acquire a second signal capable of detecting an amount of rotation of an output axis of the transmission unit from a second sensor, and to calculate, with an amount of deviation included in a result of the detection of the specific phase angle by the first signal defined for each rotational direction of the electric motor in advance, an estimated value of an absolute angle of the rotor of the electric motor using the amount of deviation of the first signal determined by a rotational direction of the electric motor, a result of the detection of the first signal, and the second signal; and a controller configured to control the electric motor using the estimated value of the absolute angle of the rotor of the electric motor.

12. A phase angle detection method of an electric motor in a drive system provided with a transmission unit that changes a rotation speed of the electric motor, comprising:

outputting, by a first sensor, a first signal for detecting at least a specific phase angle of a rotor of the electric motor;

outputting, by a second sensor, a second signal capable of detecting an amount of rotation of an output axis of the transmission unit; and calculating, with an amount of deviation included in a result of the detection of the specific phase angle by the first signal defined for each rotational direction of the electric motor in advance, an estimated value of an absolute angle of the rotor of the electric motor using the amount of deviation of the first signal determined by a rotational direction of the electric motor, a result of the detection of the first signal, and the second signal.

* * * * *